June 10, 1930. L. L. CUNNINGHAM 1,763,094
CIRCUIT CONTROLLING DEVICE
Original Filed Feb. 8, 1926 2 Sheets-Sheet 1

Inventor
LEWIS L. CUNNINGHAM
By Paul, Paul & Moore
Attorneys

Inventor
LEWIS L. CUNNINGHAM
By Paul, Paul & Moore
Attorneys

Patented June 10, 1930

1,763,094

UNITED STATES PATENT OFFICE

LEWIS L. CUNNINGHAM, OF MINNEAPOLIS, MINNESOTA, ASSIGNOR, BY MESNE ASSIGNMENTS, TO MINNEAPOLIS-HONEYWELL REGULATOR COMPANY, OF MINNEAPOLIS, MINNESOTA, A CORPORATION OF DELAWARE

CIRCUIT-CONTROLLING DEVICE

Original application filed February 8, 1926, Serial No. 86,849. Divided and this application filed October 26, 1927. Serial No. 228,855.

This invention relates to improvements in circuit controlling devices, and is divisional of my copending application for automatic devices, filed February 8th, 1926, Serial Number 86,849.

An important object is to provide means whereby the operation of a contact member by a control device, is obtained so that a stop engagement of the contact member with a contact point will allow continued movement of the control element, without breakage of the contact member. The device provides means capable of operation by a diaphragm as a thermostatic element, in such manner that the initial movement of the thermostatic member in either direction will immediately cause the contact member to make or break an electrical circuit, the arrangement further being such that after this make or break, further movement of the thermostatic element in the same direction can take place without a corresponding movement of the contact member.

Features of the invention include the means for connecting a contact member with its controlling element, as well as means for supporting the contact element in relation to its contacts. Features of the invention include all the details of construction for mounting and connecting the parts, as well as the specific arrangement.

Objects, advantages and features of the invention will be set forth in the description of the drawings forming a part of this application and in said drawings.

Figure 1:
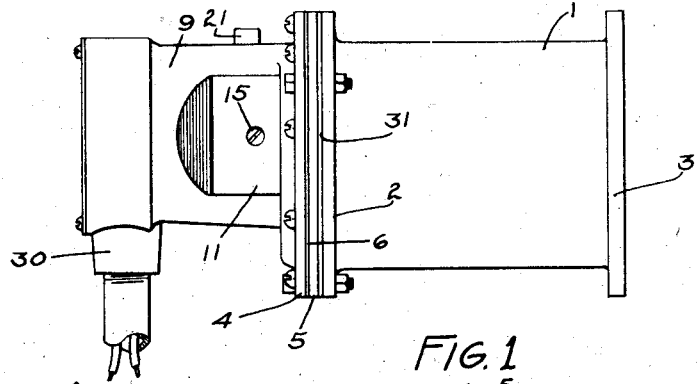
Figure 1 is a side elevation.
Figure 2:
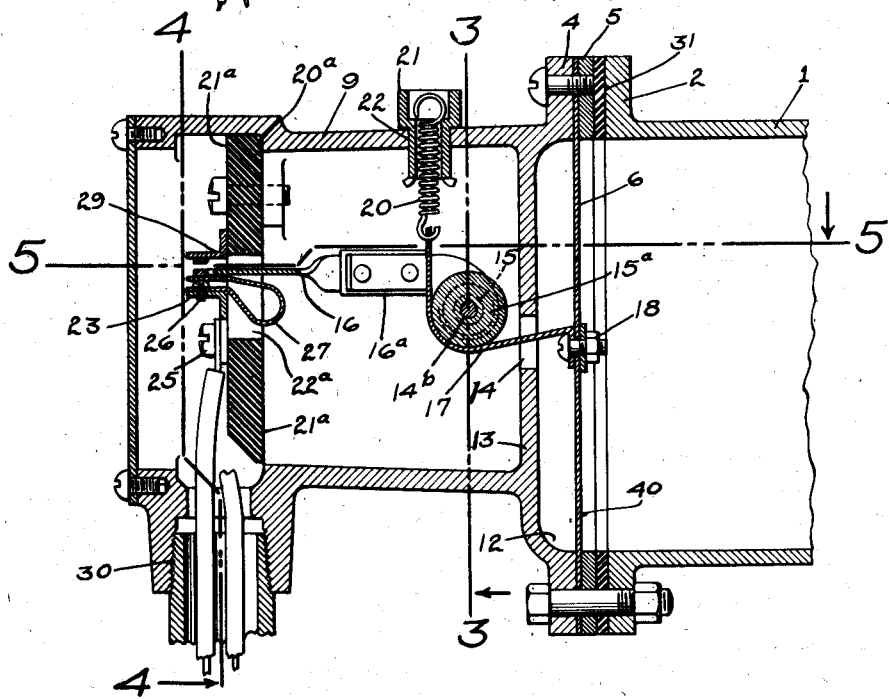
Figure 2 is a longitudinally vertical section.

In order to illustrate the device, it has been connected for operation by a diaphragmatic element which forms part of a construction wherein the diaphragm is arranged and mounted so that its deflection can be constantly maintained by radiant rays regardless of the degree of temperature or the amount of radiant energy impinging it. The manner of mounting the diaphragm forms subject matter of the copending application above mentioned. However, for the sake of clearness, the elements of the construction are described, so that the device may be illustrated in an environment, for which it is very well adapted.

The elements 1 and 9 constitute respectively means for guiding or directing the rays against a diaphragm, and for supporting the herein claimed device. The member 1 has flanges 2 and 3, the flange 3 being provided for attaching the device to the door of a furnace. The member 9 has a flange 4, the flanges 4 and 2 being of substantially the same diameter. A ring 5 is interposed between the members as shown and between this ring and the flange 4 is interposed the diaphragm 6. The elements 4, 6 and 5 are secured together by means of screws or bolts.

Figure 3:
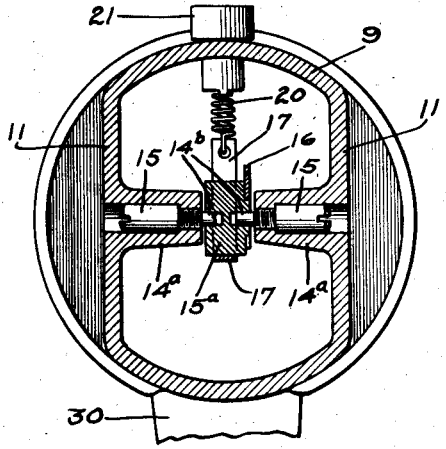
Figure 3 is a cross section on line 3—3 of Figure 2.

The casing 9 as a support and enclosure for the device herein claimed, is of tubular formation and provides a depression 12 extending in an axial direction inwardly from the flange 4. A wall 13 forms with the diaphragm 6 a small chamber, immediately adjacent the diaphragm. The wall 13 has an opening 14. Bearing-forming lugs 14$^a$ extend transversely of a constricted portion 11 of the casing 9. These lugs extend from opposite sides partially across the constricted portions as shown in Figure 3. The lugs are bored for the reception of trunnion forming screws 15, the ends of which engage corresponding depressions 14$^b$ on opposite sides of a hub or shaft 15$^a$ of contact element or control lever or arm 16. By means of the screws 15, the arm 16 is thus pivoted between the lugs for oscillation. The diameter of the hub or shaft may be decreased or increased. The arm is attached at one side of the hub 15$^a$. The hub is of sufficient diameter to provide the proper amount of surface contact for a length of copper ribbon 17. The object is to provide sufficient contact, to allow slippage between the elements under certain conditions to be mentioned. One end of this ribbon, or friction element, is attached substantially centrally of the diaphragm as at 18. At the opposite end the ribbon or frictional member is attached to a coil spring 20 which is in turn attached under tension to a headed plug 21 engaged in an opening 22 of the casing 9. The lower end of the plug is provided with prongs which are turned outwardly, after insertion, of the plug, to prevent its accidental movement when adjusted in an axial direction. Means for adjusting the tension of the spring to maintain yieldable frictional contact between the hub and ribbon is thus provided. By the use of this ribbon, yieldably tensioned and connected to the diaphragm, and by making the diameter of the hub sufficiently great, a slight deflection of the diaphragm may be made to cause a relative large movement of the outer end of the lever, this movement being controlable in varying degrees by increasing or decreasing the diameter of the hub or shaft or by lengthening the lever or contact element 16. Moreover, inasmuch as the tensioned ribbon exerts a certain deflection-producing action upon the diaphragm, the diaphragm will be caused to deflect in direction of tension of the spring when radiant energy impinges its opposite side. Thus there are two functions performed by tensioning the element 17.

Figure 4:
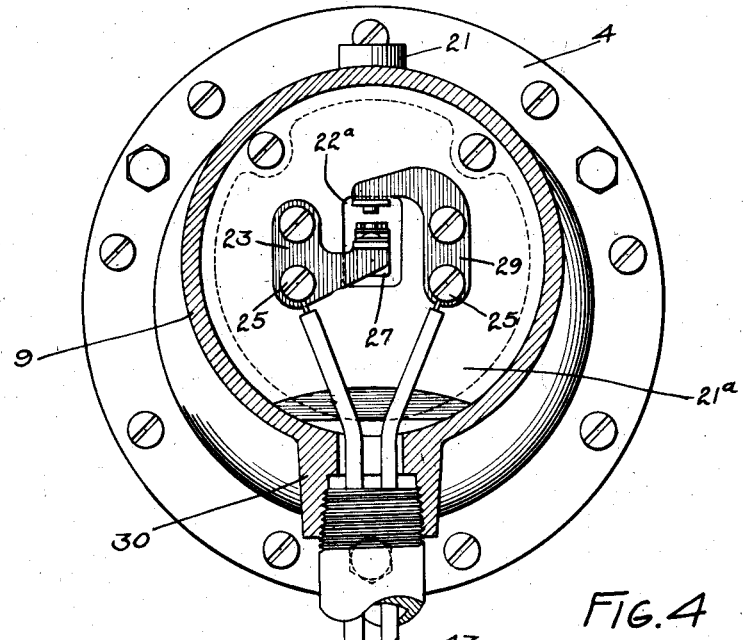
Figure 4 is a cross section on line 4—4 of Figure 2.
Figure 6:
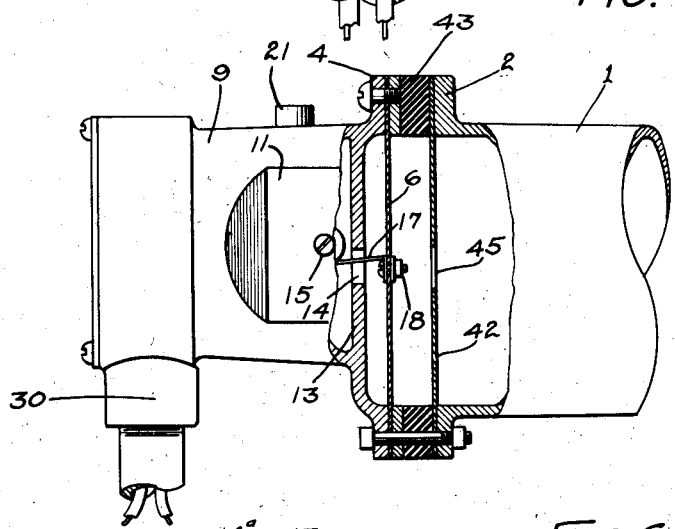
Figure 6 is a fragmentary vertical longitudinal section illustrating a modification in which a second diaphragm as a shield and focusing device is employed.
Figure 5:
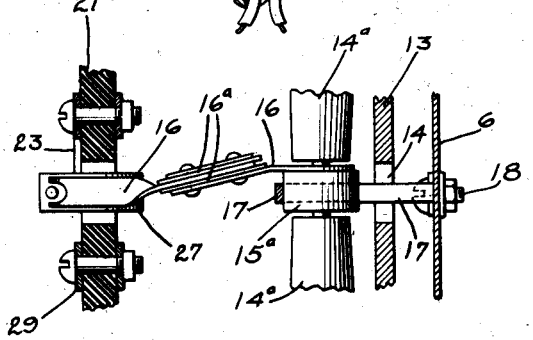
Figure 5 is a plan section on line 5—5 of Figure 1.

The casing 9 is shouldered as at 20ª and engaged against the shoulder is a disk 21ª of non-conducting material. This disk has an opening 22ª, across which projects the arm of a terminal element 23, see Figure 4. This terminal element is suitably connected by a screw to the disk and has a binding screw 25 engaged therewith for securing a wire. This arm 23 has a horizontally arranged terminal extension upon which is secured by one arm as at 26, a substantially U-shaped contact or circuit making spring 27. The opposite unattached arm of this spring has a contact knob or button engageable with a similar button carried by a terminal extension of a second terminal element 29, each terminal element 23 and 29 having a binding screw 25, see Figure 4. The outer end of the arm 16 is, in this instance, engaged against the spring element 27, normally in a manner to keep the contact buttons from engaging to close the circuit. The arm 16 is electrically insulated from the hub 16ª and is suitably secured to the hub, in this instance, by being attached to one face of the same, see Figures 3 and 5. The contact spring 27 is, in this instance, normally held compressed by engagement of the outer end of the arm 16 therewith, and the outer end of said arm is preferably slotted to provide prongs which lie on each side of the button, see Figure 5. This arrangement applies the pressure at points diametric in relation to the button. As the diaphragm is deflected in direction of the element 9, the arm is rotated in clockwise direction to release the upper arm of the spring and permit it to contact the button of the element 29. A suitable boss 30 is suitably interiorly threaded to receive a pipe in which the wires are housed. This pipe is arranged so that the wires are brought vertically downwardly to enter it.

The spring 20 is normally under slight tension such as to condition the diaphragm to travel in a direction away from the source of radiant energy. In this instance, the free arm of the spring 27 travels upwardly, and a depression of the spring breaks the electrical circuit. The spring 20 acts to maintain the frictional contact between the bar or hub or shaft of the lever of the contact arm 16, and yet permits a slippage between the two when the travel of the diaphragm is greater than is needed, this to prevent breakage of the arm 16 due to over-running. Thus it will be seen that if the movement of the diaphragm in direction away from the source of radiant energy is greater than is needed, for the upward movement of the outer end of the lever 16, slippage between the hub and element 17 will take place to prevent breakage. The means thus provided is compensatory in nature and at the same time provides for the positive operation of the contact device as the result of movement of the diaphragm in either direction. Therefore, it will be seen that when heat is applied to the diaphragm, the element 17 being frictionally engaged with the hub will rotate the arm against the tension of the spring 20. As the diaphragm continues to move after the outer end of the arm 16 has engaged the upper contact, so it can move no farther, the action of the spring will take up slack in the element 17 so that this element simply slides or slips over or along the surface of the hub or shaft. When the diaphragm cools and exerts a pull in the opposite direction to exert a greater tension on the spring, the hub will be rotated in an opposite or counter-clockwise direction and the contact broken as the result of depression of the spring 27 by the outer end of the arm 16. If the diaphragm should continue to move in the same direction after movement of the outer end of the arm 16 has been stopped by the bracket, then slippage takes place between the hub and the ribbon as in the first place, and breakage is prevented.

The use of the hub or shaft and frictional engagement of an element therewith, which is connected at one end with the diaphragm and is tensionally held at the opposite end, is believed to be a novel feature.

The features of the invention, however, as before stated, include the arrangement of the outer end of the arm 16 or its equivalent in relation to the contacts and the spring element 27. Although the specific details of construction are claimed, it is to be understood that the broad features of the invention relate particularly to the means whereby over movement of the control element 16 does not permit the arm to be broken, because of its engagement with either one of the contacts, as a stop, to prevent its further movement. It is conceivable that the element 16 itself might be a conducting element, and might be arranged to operate with only one contact, and without the use of the spring 27.

Therefore, although it is intended to claim all the details of construction, it is not intended to be limited only to those details, but to also claim broadly the flexible frictionally operable compensatory arrangement for preventing breakage by over movement of the control element, and to permit continued movement of a control element after further movement of the controlled element has been prevented.

I claim as my invention:

1. A device of the class described comprising a frame, a diaphragm, a pair of contacts one having the form of an expansible spring, an arm engageable between the contacts and engageable by the spring during expansion, said arm having a hub and an element attached to the diaphragm and frictionally engaging the hub and having its opposite end yieldably connected to the frame.

2. A device of the class described including a diaphragm, an expansible spring, as a contact-making member, a contact engageable by the spring during expansion, a pivoted arm having a hub, said arm engaged with the spring for compressing the same upon rotation of the hub, a band frictionally engaging the periphery of the hub under tension having one end yieldably supported, and the opposite end attached to the diaphragm, whereby upon movement of the diaphragm the movement of the band would cause corresponding movement of the arm, to allow expansion of or to compress the spring, and whereby when the motion of the arm is prevented, slippage between the band and hub will permit further motion of the diaphragm.

3. A device of the class described comprising a support, an expansible element upon the support, a resiliently actuated contact element, a pivoted arm engaged with said contact element in a manner to move it against its resilient force, said arm having a hub co-axial with its pivotal point, a band frictionally engaging the hub and having one end attached to the expansible element and the other yieldably connected to the support, the arrangement being such that when the expansible element moves in one direction the pivoted arm releases the resiliently actuated contact, the arm being free to move away from said element in a direction of its resiliently actuated movement.

In witness whereof, I have hereunto set my hand this 20th day of October 1927.

LEWIS L. CUNNINGHAM.